United States Patent
Baney et al.

(10) Patent No.: US 6,515,276 B2
(45) Date of Patent: Feb. 4, 2003

(54) HETERODYNE OPTICAL SPECTRUM ANALYZER WITH PROVISIONS FOR INTENSITY NOISE SUBTRACTION

(75) Inventors: Douglas M. Baney, Los Altos, CA (US); Bogdan Szafraniec, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 117 days.

(21) Appl. No.: 09/811,220

(22) Filed: Mar. 17, 2001

(65) Prior Publication Data

US 2002/0130255 A1 Sep. 19, 2002

(51) Int. Cl.[7] ............................................... H04B 10/18
(52) U.S. Cl. ................................... 250/227.19; 359/124
(58) Field of Search ........................ 250/227.19, 227.18, 250/227.11; 359/110, 124, 191

(56) References Cited

U.S. PATENT DOCUMENTS 6,259,529 B1 * 7/2001 Sorin et al. .................. 356/484
6,400,479 B1 * 6/2002 Zhou et al. .................. 359/134

* cited by examiner

*Primary Examiner*—Georgia Epps
*Assistant Examiner*—Richard Hanig

(57) ABSTRACT

A coherent optical spectrum analyzer is provided in which an optical balancing tone having a specific signature is injected into a signal path of a balanced optical receiver. A measuring unit is provided to analyze the balancing tone component in the signal output from the balanced optical receiver and determine characteristics of the optical receiver. A compensation unit is provided for providing compensation to counter, or negate any imbalances determined via the measuring unit. The balanced optical receiver is preferably a polarization state independent optical receiver.

28 Claims, 16 Drawing Sheets

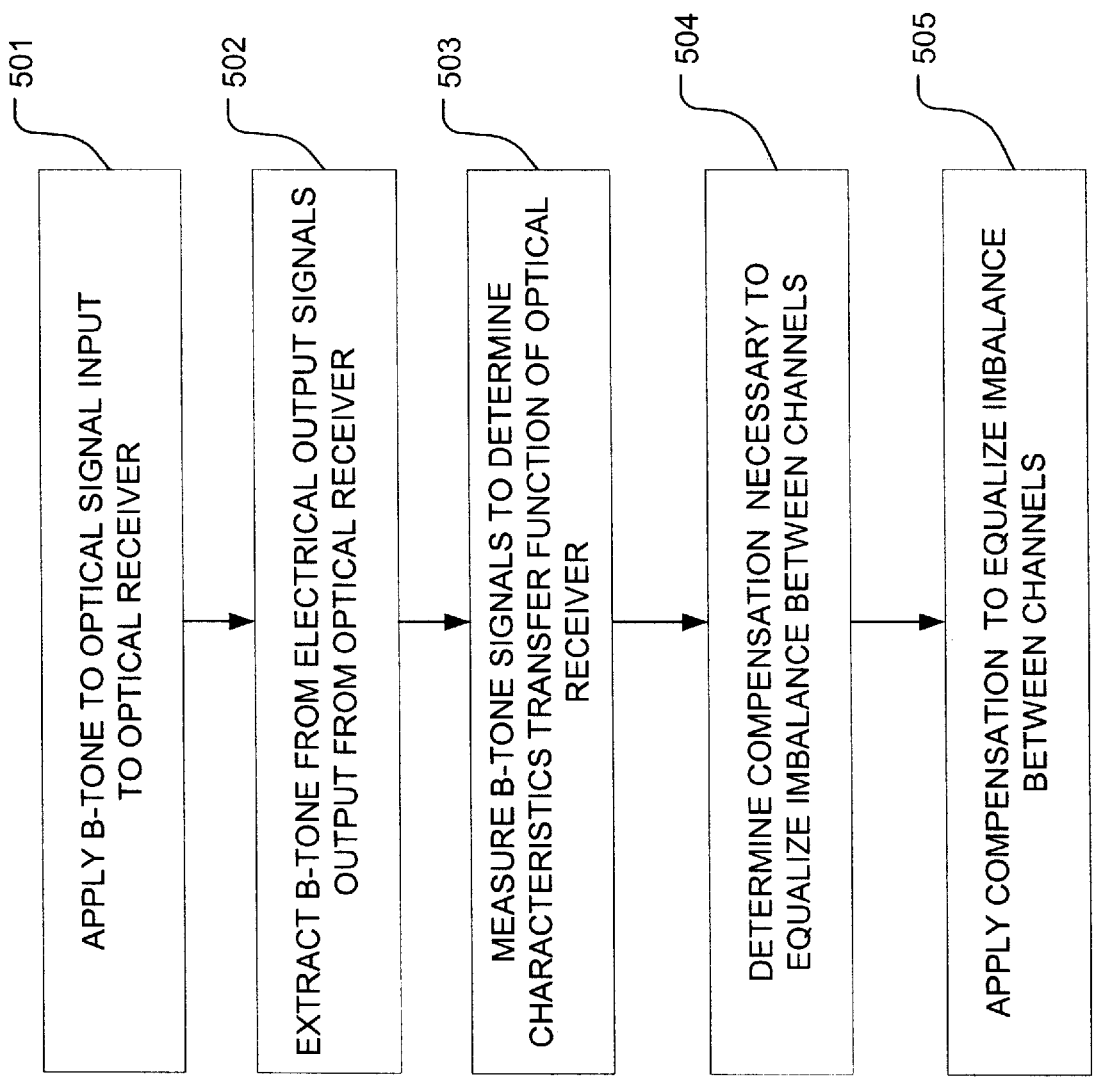

HETERODYNE OPTICAL SPECTRUM ANALYZER WITH PROVISIONS FOR INTENSITY NOISE SUBTRACTION

FIELD OF THE INVENTION

The present invention is generally directed to a heterodyne optical spectrum analyzer. More particularly, the present invention is directed to a heterodyne optical spectrum analyzer having provisions for compensation of asymmetries of a heterodyne receiver based upon measurements of a known balancing tone (b-tone) input signal.

BACKGROUND OF THE INVENTION

Because of their high resolution, heterodyne optical spectrum analyzers are useful for spectral analysis of dense wavelength division multiplexing (DWDM) systems. Unfortunately, the presence of intensity noise within each optical channel of a DWDM system can degrade signal quality output by heterodyne optical receivers. As the number of channels incident on a heterodyne receiver/detector increases, so does the level of intensity noise that the heterodyne receiver must suppress.

With reference to FIG. 1 a known optical receiver 1 for reducing intensity noise is disclosed. In this known system an optical coupler 6 receives an input signal and an local oscillator signal (LO) and mixes, or combines, the two signals to output mixed/combined optical signals which are detected by two photodiodes 2 and 3. Photodiodes 2 and 3 are connected in series. The connection point 4 serves as a virtual ground, which allows for common mode rejection of intensity noise. This solution provides typically 20 to 30 dB of noise reduction which may be adequate where a relatively small number of available optical channels of a DWDM system are presented to the optical receiver 1, for example ten (10) channels or fewer. As the presence of DWDM channels increases a means of achieving better noise subtraction is needed.

Thus, a heretofore unaddressed need exists in the industry to address the aforementioned deficiencies and inadequacies.

SUMMARY OF THE INVENTION

The present invention provides a heterodyne optical spectrum analyzer having provisions for subtracting noise presented to it by a dense wavelength division multiplexing (DWDM) signal or system.

Briefly described, in architecture, the system can be implemented as follows. A local oscillator is provided for generating a local oscillator signal. There is provided a balancing tone generator for generating an optical balancing tone (b-tone). A balanced heterodyne optical receiver having a first and a second channel is provided for receiving the b-tone signal and outputting two electrical signals in response to the optical b-tone. A measuring unit is provided for measuring the electrical output signals and determining their characteristic transfer functions.

The present invention can also be viewed as providing a method for analyzing an optical signal in which a balancing tone is injected into an optical path and input to a balanced heterodyne optical receiver. Electrical signals output from the balanced heterodyne optical receiver in response to the input balancing tone are measured to determine their characteristics. Based upon differences in the measured characteristics of the electrical output signals, a compensating transfer function is determined and applied to the signal path to offset the measured differences.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a flowchart illustrating an embodiment of the method of the present invention;

DETAILED DESCRIPTION OF THE PREFERRED EMBODIMENT

The present invention provides for reduction of intensity noise in a coherent optical spectrum analyzer (COSA). By reducing the intensity noise, the dynamic range of the COSA can be improved so that it is possible to measure the spectral density of noise in an optical system. The optical spectrum analyzer of the present invention provides for greater noise rejection by reducing the level of noise that a balanced detector system must reject.

Figure 1:
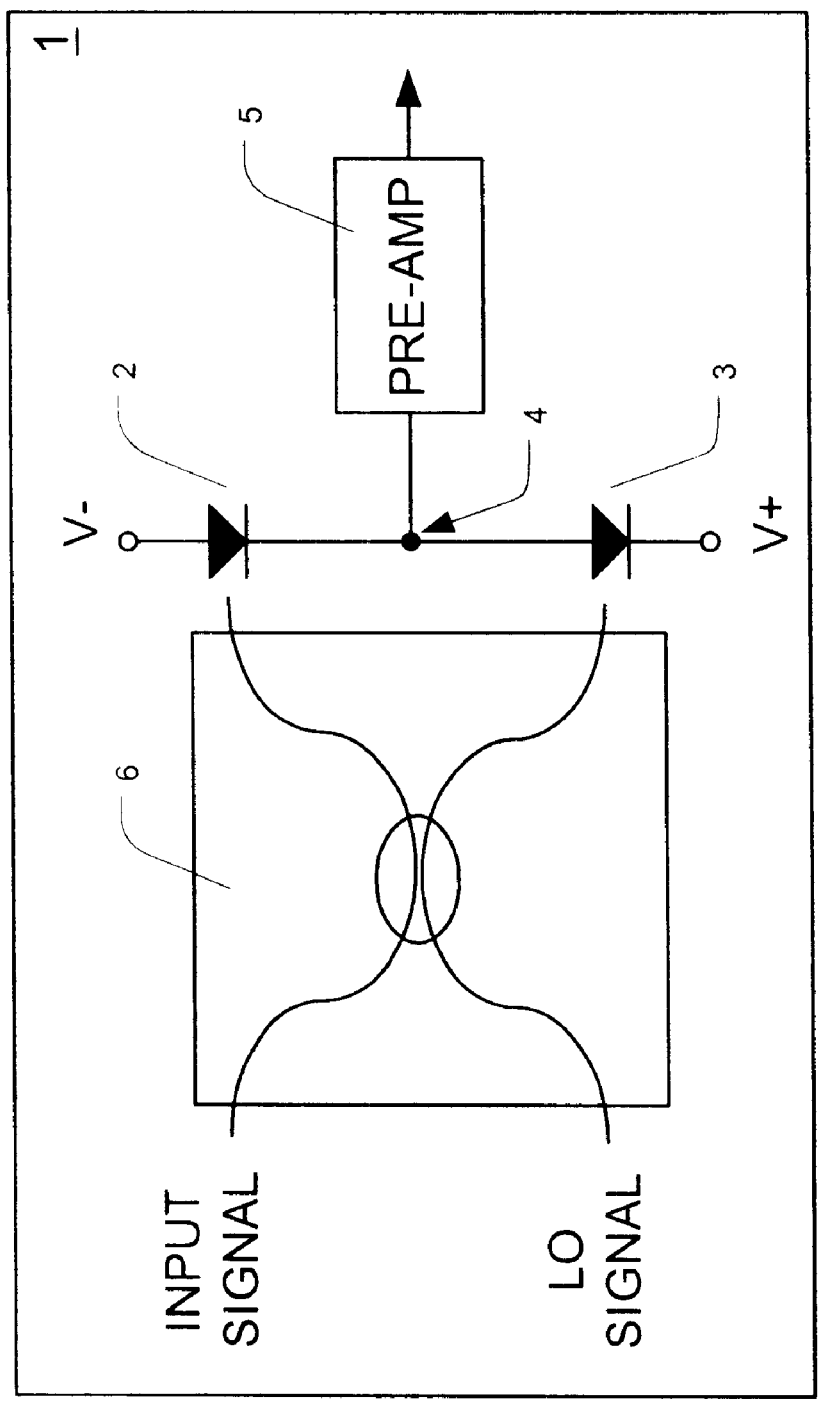
FIG. 1 is an illustration depicting a prior art optical receiver.
Figure 2A:
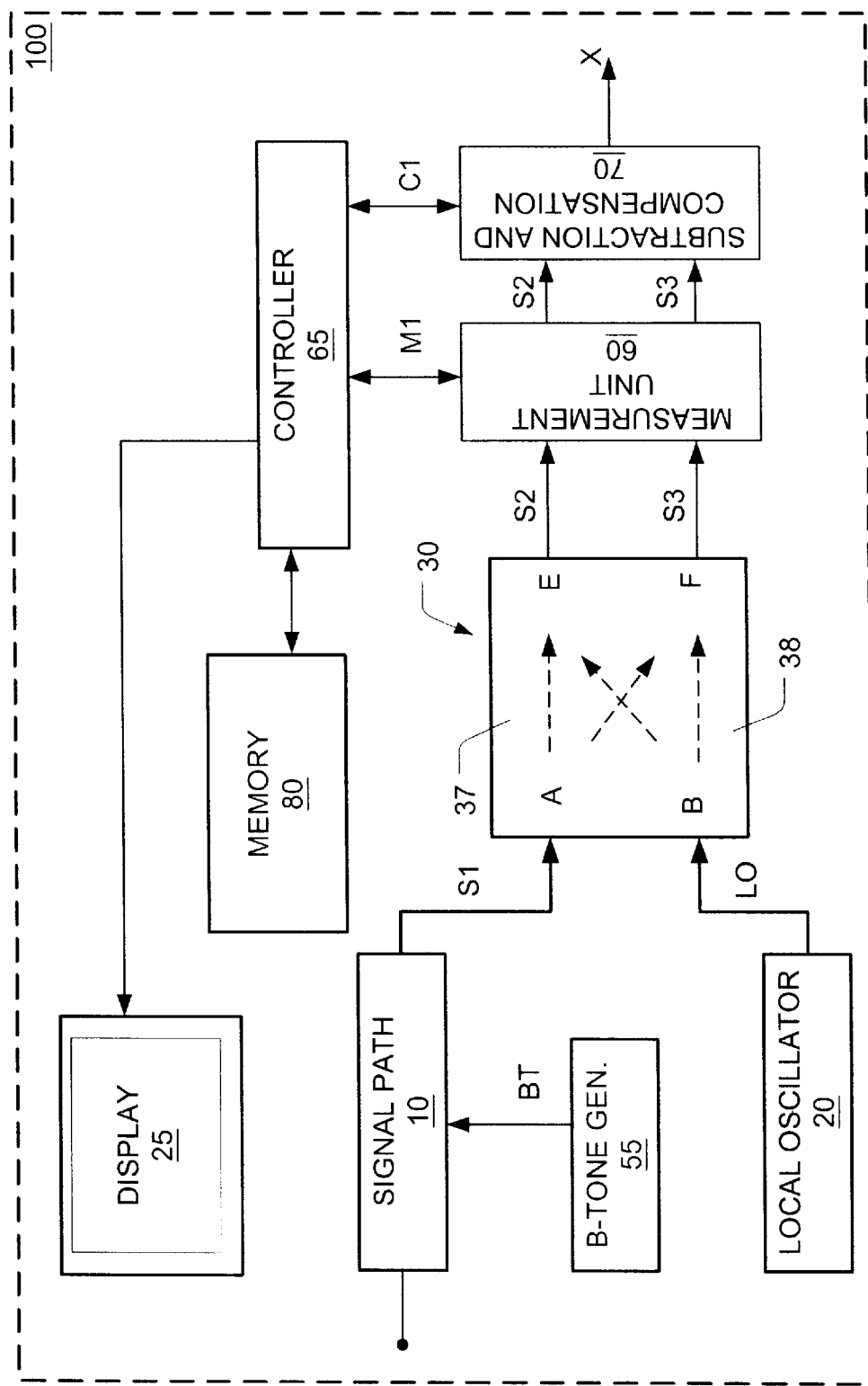
FIG. 2A illustrates an embodiment of a heterodyne optical spectrum analyzer.

FIG. 2A illustrates an embodiment of a heterodyne optical spectrum analyzer 100 according to the present invention. There is provided a local oscillator 20 for generating a local oscillator signal (LO) and providing the LO to an input B of optical receiver 30. Local oscillator 20 may be, for example, a laser source, such as, a tunable external cavity laser diode. An optical signal path 10 is connected to an input A of optical receiver 30. Optical signal path 10 provides an input signal to input A of receiver 30. A balancing tone generator (b-tone generator) 55 is provided for generating an optical b-tone BT which may be injected into the signal path 10 for calibrating the spectrum analyzer 100 to offset any imbalances in optical receiver 30.

Optical receiver 30 may be, for example, a balanced optical receiver; that is, an optical receiver in which the input signals are substantially equally split between the channels of the optical receiver. Optical receiver 30 has two inputs A and B and two outputs E and F. Optical receiver 30 is composed of a first channel 37 and a second channel 38. The first channel 37 is defined by the signal path between input A and the output E, while the second channel 38 is defined by the signal path between input A and the output F. Inputs A and B are optical inputs for receiving optical signals. Outputs E and F are electrical outputs for outputting electrical signals. Each of channels 37 and 38 includes an optical signal path that is connected to an electrical path.

A measurement unit 60 is connected to, and receives electrical signals S2 and S3 from, the outputs E and F of optical receiver 30. Measurement unit 60 measures the signals S2 and S3 and generates a measurement signal M1, indicative of the relative characteristics of the signals S2 and S3, that is provided to the controller 65. A subtraction and compensation unit 70 is provided for carrying out noise subtraction operations and outputting an output signal X. Subtraction and compensation unit 70 may be controlled by controller 65, based upon the measurement signal M1, to compensate for any imbalances or noise in the response/transfer characteristics of the channels 37 and 38. A display 25 may be provided to display graphical information concerning the measurement and/or compensation applied to the input signals. Controller 65 may be configured to provide a display signal to the display 25.

Controller 65 may be configured to cause measurement unit 60 to carry out measurements in accordance with measurement instructions (software) stored on memory 80. Further, controller 65 may, for example, be configured to cause subtraction and compensation operations to be carried out by the subtraction and compensation unit 70 in accordance with subtraction and compensation instructions (software) that may be stored on memory 80.

Figure 2B:
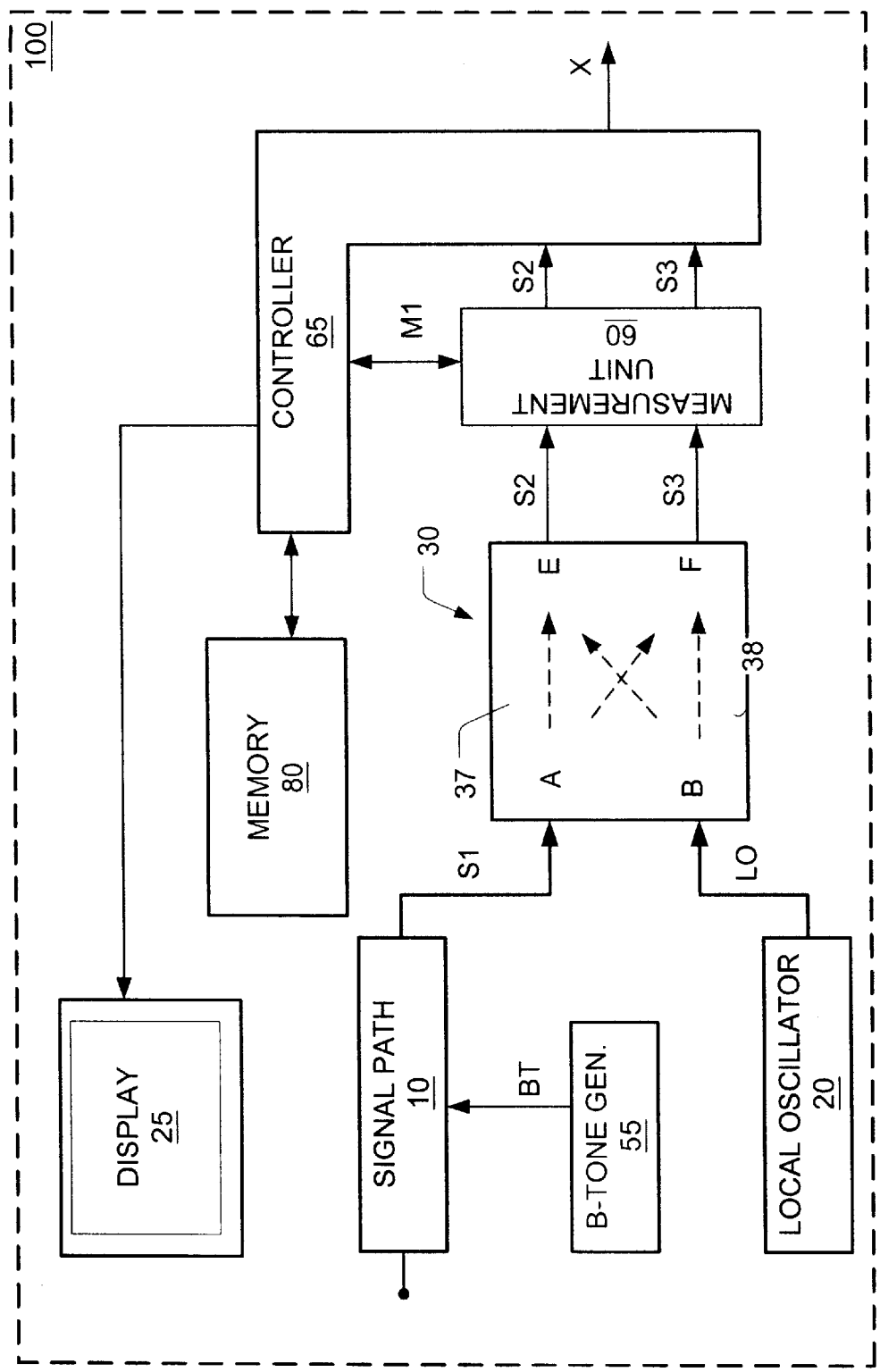
FIG. 2B illustrates a further embodiment of a heterodyne optical spectrum analyzer according to the invention.

FIG. 2B illustrates a further embodiment of an optical spectrum analyzer in which the functions and operations of subtraction and compensation unit 70 are carried out by controller 65 in accordance with the input signal M1 from measurement unit 60. It will be recognized that the operations and functions of controller 65, as well as measurement unit 60 and subtraction and compensation unit 70 may be carried out by a controller or processor in accordance with software instructions stored, for example, on a memory 80.

Figure 2C:
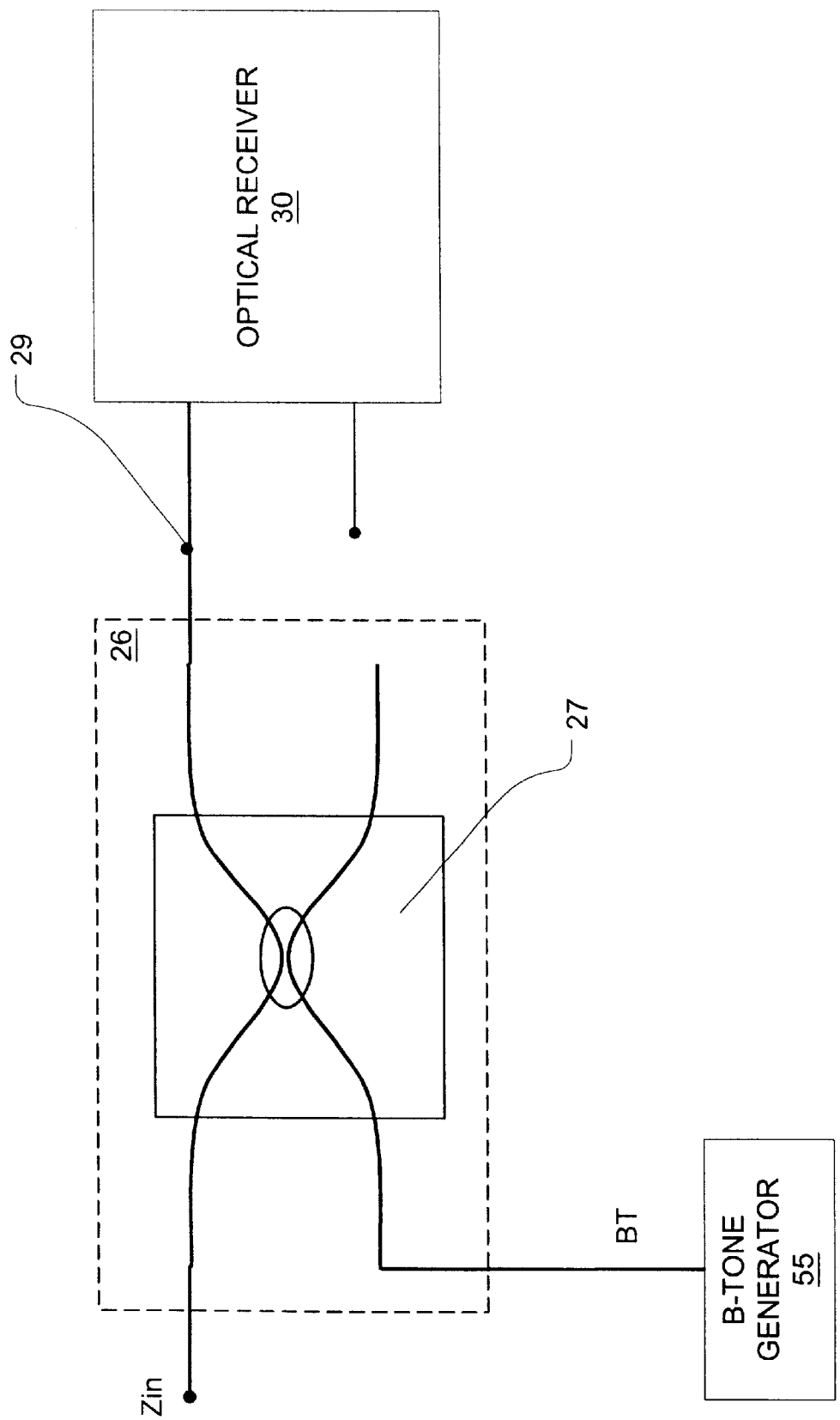
FIG. 2C illustrates an optical mixer 26 for injecting a b-tone into an optical receiver.

FIG. 2C illustrates an optical mixer 26 for injecting an optical b-tone BT into optical receiver 30. It can be seen that b-tone generator 55 outputs a b-tone BT to optical coupler 27. Optical coupler 27 combines the b-tone BT with the signal input Zin. Signal input Zin may be, for example, the local oscillator signal LO output from local oscillator 20. Alternatively, input signal Zin may be a signal input to the system 100 via optical signal path 10 (FIG. 2B) for analysis (signal under analysis). Optical coupler 27 may be configured to provide any split ratio that may be desired. For example, optical coupler 27 may be configured to provide for a 90/10 split ratio that provides, for example, 90% of the signal Zin at an output 29, while only 10% of the b-tone BT appears at the output 29.

Figure 3A:
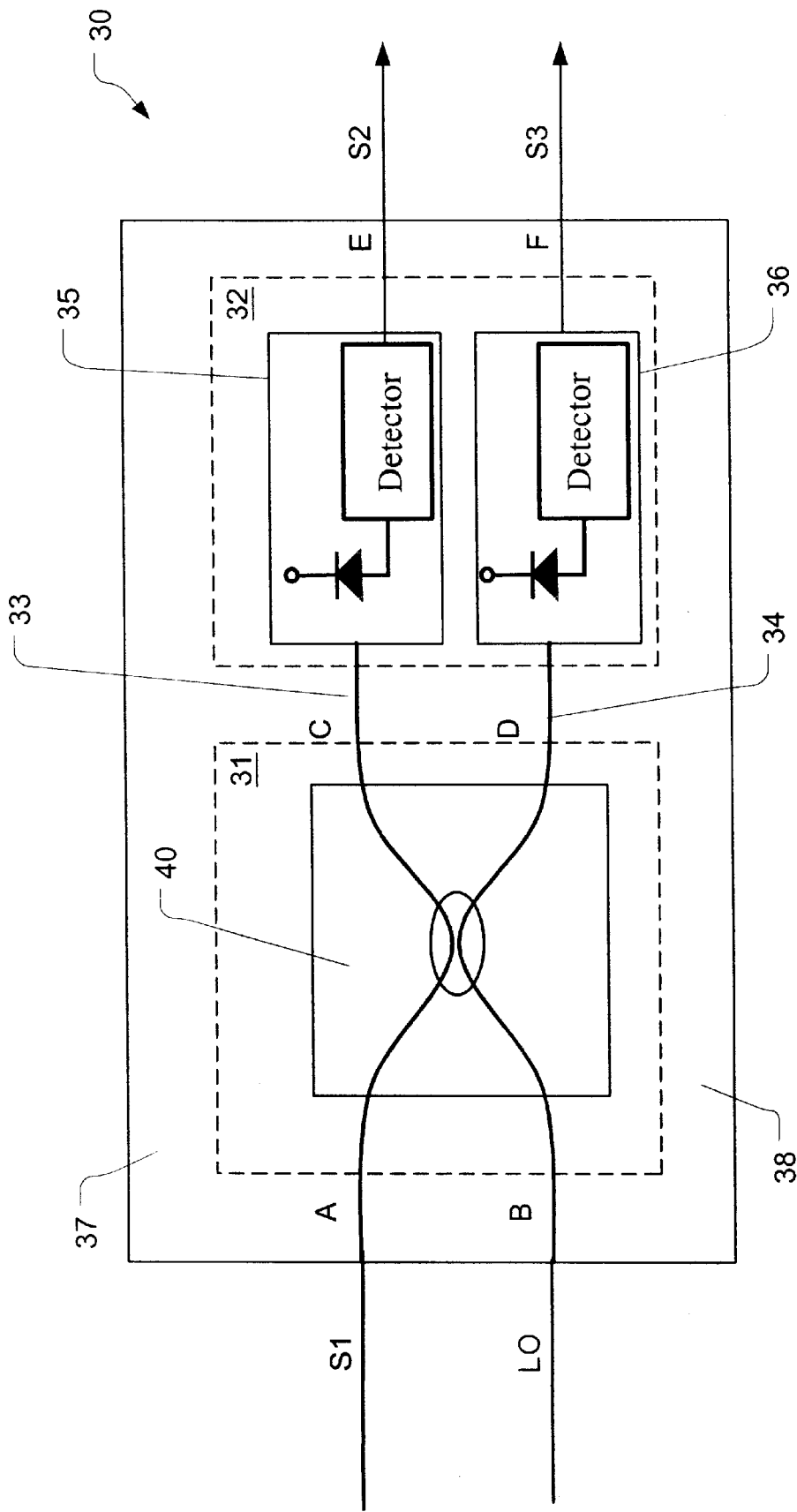
FIG. 3A illustrates a heterodyne optical receiver.

With reference to FIG. 3A, a detailed illustration of optical receiver 30 will be described. Optical receiver 30 has two channels 37 and 38, each of which includes an optical section 31 and an electrical section 32. Optical section 31 includes an optical coupler 40 having the two optical inputs A and B as well as two optical outputs C and D. Optical coupler 40 is preferably a balanced optical coupler which receives a local oscillator signal LO via input B and an input optical signal S1 from the signal path 10 via input A.

A balanced optical coupler has a coupling or combining efficiency of substantially 50% for each input. Optical coupler 40 mixes, or combines, the optical signals received via inputs A and B, and outputs mixed optical signals via optical outputs C and D. More particularly, a portion of each of the signals S1 and LO presented to the inputs A and B, respectively, of optical receiver 30 will be distributed to each of the optical outputs C and D. The portion of the signal distributed will be dependent upon the splitting ratio of the optical coupler 40. The optical coupler 40 is preferably a 50/50 split optical coupler, however optical couplers having other split ratios such as, for example, but not limited to, a 10/90 split ratio may be used as well.

Electrical section 32 includes a detector 35 that is coupled to the optical output C of optical coupler 40 via optical lead 33, and detector 36 that is coupled to the optical output D via optical lead 34. Detector 35 generates an electrical signal S2 (detected signal S2) in response to an optical signal at output C and detector 36 generates an electrical signal S3 (detected signal S3) in response to an optical signal at output D. More particularly, detectors 35 and 36 respond to the intensity of an optical signal at outputs C and D, respectively. Detectors 35 and 36 are preferably photodiodes, however any photo detection device may be used.

With reference to FIG. 3A, it should be noted that the electrical signals S2 and S3 generated by the detectors 35 and 36 in response to the mixed optical signals output by optical coupler 40 have opposite phase while the intensity characteristics (terms) of these electrical signals have the same signs or phase. This is illustrated as follows by equations EQ.1 and EQ. 2:

$$i_1 \approx R\sqrt{\langle \Delta^2 P \rangle_{signal\ noise}} + R\sqrt{P_{LO}P_{sig}}\cos(2\pi\Delta ft + \Delta\varphi(t)) \quad \text{EQ.1}$$

$$i_2 \approx (1+\beta)R\sqrt{\langle \Delta^2 P \rangle_{signal\ noise}} - R\sqrt{P_{LO}P_{sig}}\cos(2\pi\Delta ft + \Delta\varphi(t)) \quad \text{EQ.2}$$

where β represents the imbalance that might occur between the channels 37 and 38 of optical receiver 30. P represents optical power; $\Delta f$ represents the difference between the frequencies of the local oscillator signal LO and the input signal. $\Delta f$ also equals the electrical frequency of the signals S2 and S3 output by detectors 35 and 36 (FIG. 3A). t represents time. The effects of laser phase noise are modeled by $\Delta\psi(t)$.

Equations EQ. 1 and EQ 2 describe photocurrents $i_1$ and $i_2$ from the detectors 35 and 36 (FIG. 3A). These photocurrents contain power contributions from light intensity passing through channels 37 and 38 of the optical receiver 30 as well contributions from the mixing, or interference, of an input signal (signal light) with local oscillator signal (local oscillator light). It equations EQ. 1 and EQ. 2, it is assumed that noise introduced to the optical receiver via the local oscillator is negligible.

By subtracting $i_1$ from $i_2$ it is possible to cancel the intensity noise to the precision allowed by the imbalance represented by the magnitude of β, as shown by equation EQ. 3:

$$i_2 - i_1 \approx \beta R \sqrt{\langle \Delta^2 P \rangle_{signal\ noise}} - 2R\sqrt{P_{LO}P_{sig}} \cos(2\pi\Delta f t + \Delta\varphi(t)) \quad \text{EQ.3}$$

Figure 3B:
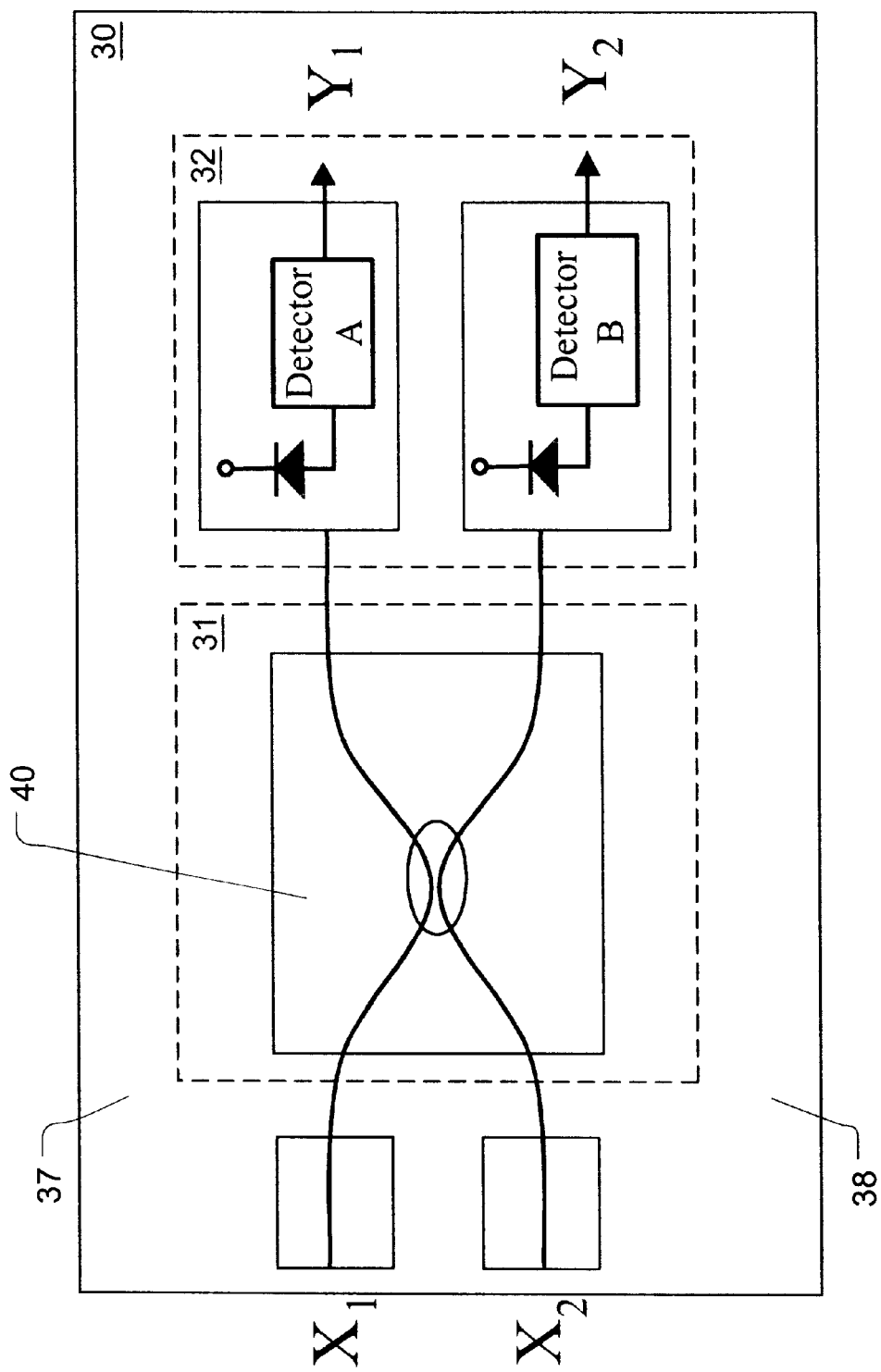
FIG. 3B is a further illustration to aid discussion of the optical receiver of FIG. 3A.

With reference to FIG. 3B, optical receiver 30, as well as each channels 37 and 38, can be characterized by a characteristic transfer function. To optimize noise subtraction, the measured outputs $Y_1$ and $Y_2$ can be first modified by the respective transfer function and then subtracted as follows:

$$\Delta Y = T_1(\nu,P,f)Y_1 - T_2(\nu,P,f)Y_2 \quad \text{EQ.4}$$

which may be expressed in simpler notation as follows:

$$\Delta Y = Y_1 - R(\nu,P,f)Y_2 \quad \text{EQ. 5}$$

It can be seen that the process of finding an optimal function $R(\nu,P,f)$ involves solving a multi-dimensional problem. An optimal function may be a transfer function at which a detected b-tone will be zero, or near zero when applied as compensation to the system.

As the transfer function for receiver 30, as well as each channel 37 and 38, may be separable in terms of the optical frequency and the electrical frequency, the electrical response for each channel 37 and 38 can be measured at a constant optical frequency (wavelength) while the optical frequency response can be measured at a constant electrical frequency including DC (0 Hz).

In a preferred embodiment of the present invention the transfer function ratio is determined for the two channels 37 and 38 of the receiver 30 and one input port $X_1$. The transfer function ratio R may be expressed as $Y_1/Y_2$ where $Y_1$ and $Y_2$ are represented by the complex functions in frequency domain and contain amplitude and phase information, li.e., $Y=a \exp(j\psi(f))$. The ratio R may be expressed as:

$$R = Y_1/Y_2 = A(\nu,f)\exp(j\Phi((f))) \quad \text{EQ. 6}$$

The ratio of amplitudes, $A(\nu,f)$, depends on the optical frequency and the electrical frequency of the b-tone signal. The phase term, $\Phi(f)$, depends on the electrical frequency of the b-tone signal only. However, the phase term may be influenced by characteristics of the optical section 31 of receiver 30 if the optical section 31, and more particularly, the components of channels 37 and 38, are not equal. Any imbalance in the optical characteristics of channels 37 and 38 will introduce a relative delay resulting in a linearly changing component of the phase term $\Phi(f)$. Thus, it is preferable to equalize the optical paths of channels 37 and 38 to make the function $\Phi(f)$ dependent primarily on the electrical section 32 of the receiver 30.

The transfer function ratio, $R(\nu,f)$, can also be estimated using other known methods, e.g., time-domain measurement of the unit step response. The unit step response may be measured for the square wave modulation of light intensity of a signal applied to the input. The frequency domain representation can be found by calculating an impulse response and then finding a Fourier transform.

Compensation for any measured imbalances between the signals S2 and S3 may be referred to as the transfer function correction and can be performed in the frequency domain or in the time domain. In the frequency domain, the data sampled at the output ports $Y_1$ and $Y_2$ is transformed to the frequency domain, corrected, and then transformed back to the time domain, as follows:

$$\Delta y(t) = FT^{-1}(FT(y_1(t)) - R(\nu,f)FT(y_2(t))) \quad \text{EQ. 7}$$

Where FT is the Fourier transform; $FT^{-1}$ is the inverse Fourier transform; $y_1$ is the time domain representation of the signal response at Y1; $y_2$ is the time domain representation of the signal response at Y2 and t represents time.

In the time domain, the transfer function ratio, $R(\nu,f)$, is transformed to the time domain (impulse response r(t)) and then, convolved with time domain sampled data in accordance with the following:

$$\Delta y(t) = y_1(t) - FT^{-1}(R(\nu,f))*y_2(t) \quad \text{EQ. 8}$$

In the method of the present invention, and with further reference to FIG. 2A, an optical tone, or b-tone, BT, is injected into the heterodyne optical receiver 30 via either input A or B. The b-tone BT is generated by b-tone generator 55 and has a specific signature, or frequency, which can be easily distinguished by the measurement unit 60 in the detected output signals S2 and S3. In other words, b-tone BT is of a frequency or character which is not easily confused as an input information signal. For example, the b-tone BT may be a swept frequency carrier with a swept sub-carrier b-tone. As further example, the swept frequency carrier may be, for example, but not limited to, in the range of 1500 nm–1600 nm. The swept sub-carrier b-tone may be, for example, swept in the range of 0 Hz–100 MHz. In the embodiment shown in FIG. 2A, the b-tone signal BT is injected into the signal path 10 and input to optical receiver 30 via input A.

The injected b-tone BT is incident on the input A of the balanced receiver 30. Any imbalances β, between the channels 37 and 38, will be detected, or indicated, by the magnitude of the b-tone after subtraction of the output signals S2 and S3. In other words, the amplitude of the detected b-tone is proportional to the imbalance between the channels 37 and 38.

Figure 4A:
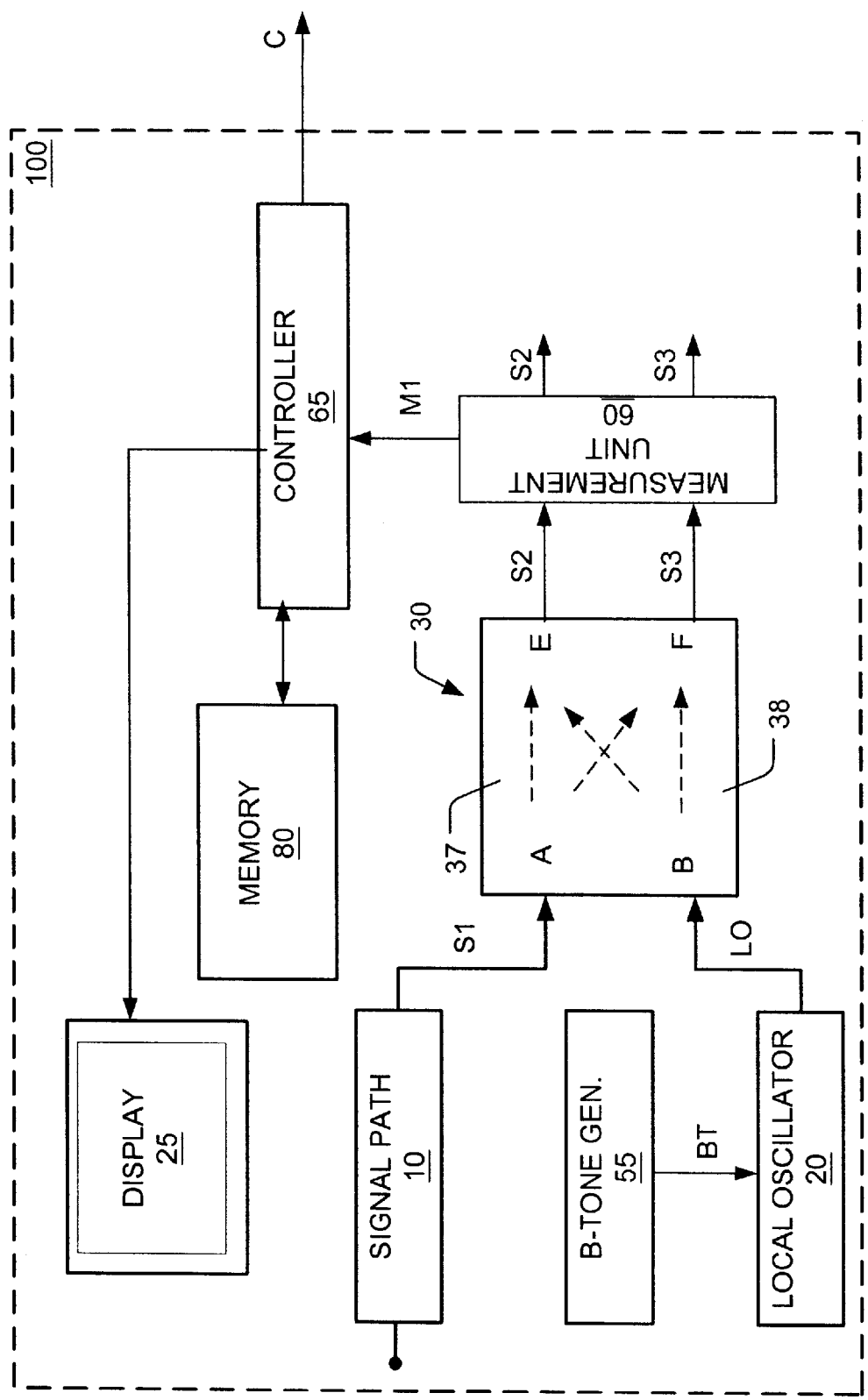
FIG. 4A and FIG. 4B illustrate further embodiments of a coherent optical spectrum analyzer according to the present invention.

The b-tone BT injected into the optical receiver 30 can serve as a feedback signal which can be used to adjust or compensate the balance between channels 37 and 38 of receiver 30, either through adjustments to the hardware or through changes in the numerical data via digital processing of the output signals S2 and S3, or through a combination of both means. In this way it is possible to reduce the effect of any imbalance β to near zero. As a result noise can be significantly reduced and the sensitivity and dynamic range of the COSA can be enhanced. It should be noted that β can be a function of a baseband frequency. Thus, in some cases, such as where the detection bandwidth is broad, it may be desirable to use a b-tone BT that is frequency agile or broadband. Further it may be desirable to set the b-tone frequency at a frequency that does not correspond to a frequency of the signal under analysis. In an alternative embodiment, the b-tone generator 55 may be configured to output the b-tone signal BT to optical receiver 30 via the local oscillator 20, as shown in FIG. 4A. The b-tone generator may also be configured to output the b-tone signal T along with the local oscillator signal LO directly to the input B of the optical receiver 30 as shown in FIG. 4B.

Noise introduced via the local oscillator can be reduced using similar techniques as delineated by equations EQ. 1 through EQ. 8 as described with regard to reduction of noise introduced by input signal to input path 10.

Figure 4B:
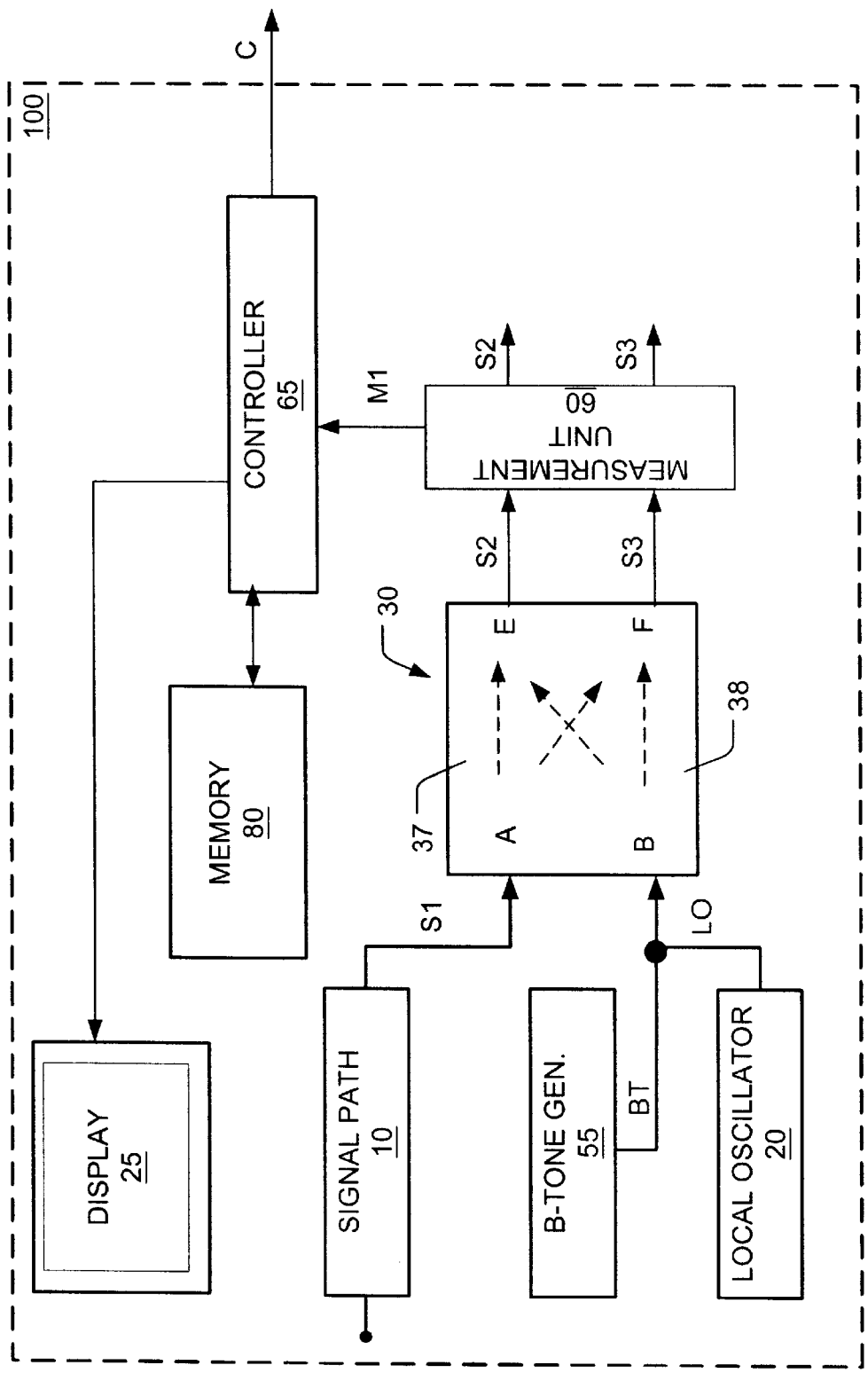

With further reference to FIG. 4A and FIG. 4B it can be seen that the outputs S2 and S3 from the optical receiver 30 are received by measurement unit 60. Measurement unit 60 carries out measurements of the signals S2 and S3 to determine their respective characteristics and outputs a measurement signal M1 to the controller 65. In turn the controller 65 generates a compensation signal C that can be used to carry out adjustments in the system to compensate for any measured imbalances or differences between the signal S2 and S3.

FIG. 5 is a flowchart illustrating the method of the present invention. In this method, a balancing tone is applied to an input of a balanced optical receiver of a heterodyne spectrum analyzer of the present invention (501). The balancing tone is then extracted from the electrical signals output from the channels of the optical receiver (502). The balancing tones extracted from the electrical signals output from the channels of the optical receiver are measured to determine the respective characteristics of the channels of the optical receiver (503). Subsequently, it is determined what compensation to apply in order to offset the effect of any imbalances between the channels of the optical receiver (504). Subtraction of noise from the output electrical signals is carried out with compensation applied (505).

The flow chart of FIG. 5 illustrates the methodology of the present invention. Further, the flowchart of FIG. 5 may be viewed as illustrating the architecture, functionality, and operation of a possible implementation of software for carrying out the methodology of the present invention. This software may be stored, for example, in memory 80 of the optical spectrum analyzer of FIG. 2A. In this regard, each block of FIG. 5 represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as will be further clarified hereinbelow.

Figure 6:
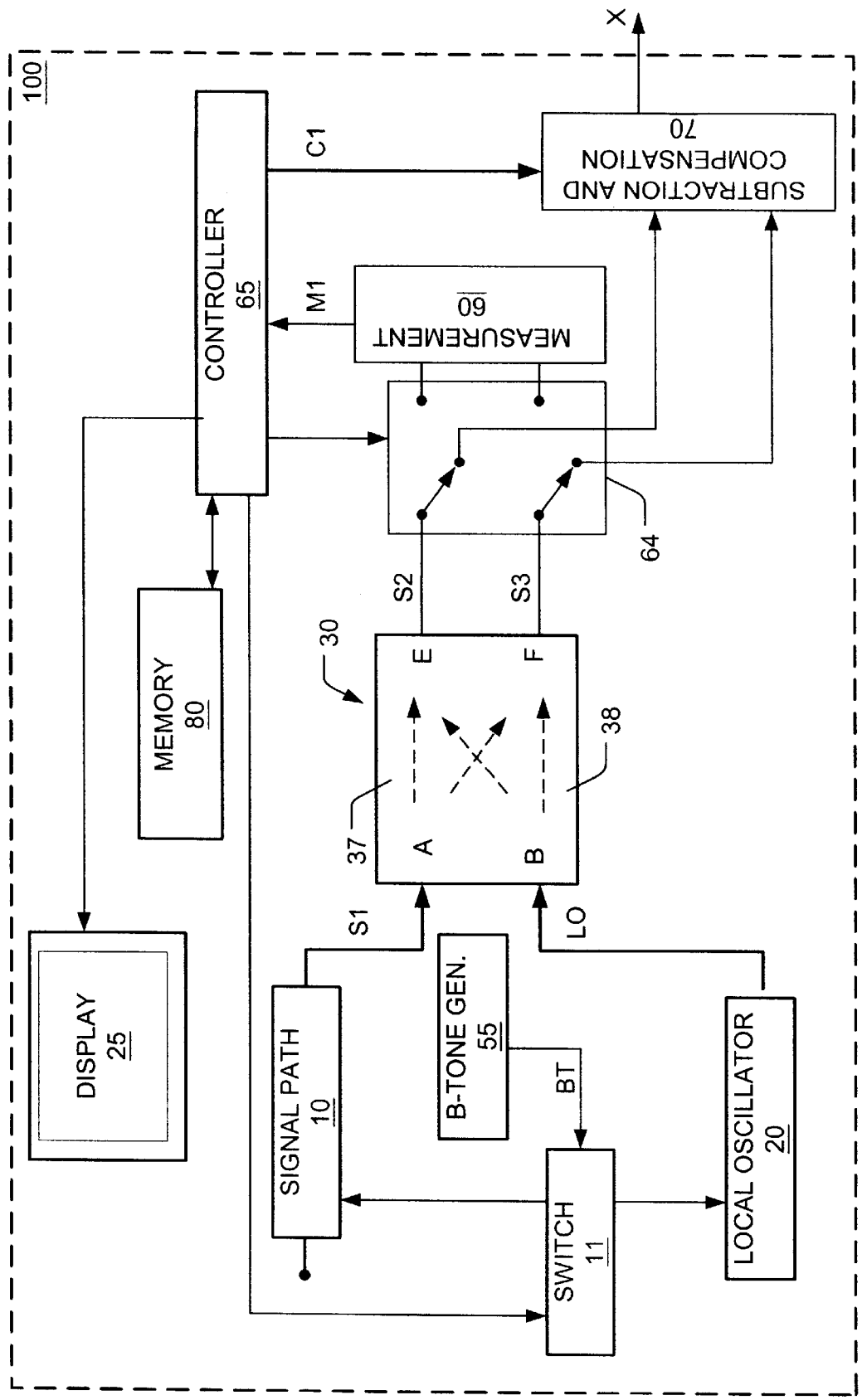
FIG. 6 illustrates a system for optical receiver calibration and measurement.

In a further embodiment shown in FIG. 6, spectrum analyzer 100, may be configured to operate in two modes of operation. More particularly, the optical spectrum analyzer may be configured to provide for a "normal" mode of operation and a "calibration" mode of operation.

In this embodiment, a switch 64 may be provided for receiving signals S2 and S3 from optical receiver 30. Switch 64 may be controlled by controller 65. Switch 64 provides the signals S2 and S3 to either measurement unit 60 or subtraction and compensation unit 70. Subtraction and compensation unit 70 is responsive to a control signal C1 from controller 65.

During the normal mode a signal, typically an information signal, is input via signal path 10 and subsequently measured by measurement unit 60. During the calibration mode, a known b-tone BT is provided to the heterodyne optical spectrum analyzer 100 via either the optical signal path 10 or the local oscillator signal LO. With reference again to FIG. 3A, this signal is incident on the optical coupler 40, which outputs corresponding optical signals via outputs C and D. The corresponding optical signals are detected by detectors 35 and 36, which generate electrical output signals S2 and S3 in response. As there are generally differences, or asymmetries (imbalances), between the optical section 31 and electrical section 32 of both the receiver channel 37 and receiver channel 38, there will typically be differences, or imbalances, between the two signals S2 and S3 that are due solely to the asymmetries between the receiver channel 37 and receiver channel 38. The signals S2 and S3 are measured to determine their characteristics including any differences or asymmetries that exist between the two signals S2 and S3. This measurement information is then used to provide compensation to the output of the signal path for use during the normal mode of operation to offset, or negate any asymmetries indicated by the measurement information.

During the calibration mode of operation, the measurement unit 60 is connected to the outputs E and F of the optical receiver 30 via switch 64. Measurement unit 60 measures, or characterizes, the signals S2 and S3 at the outputs E and F and generates a measurement signal M1 representative of the relationship of the measured signals S2 and S3. More particularly, measurement unit 60 determines the characteristic transfer functions of each channel 37 and 38 of optical receiver 30 and the transfer function ratio thereof.

During the normal mode of operation, compensation unit 70 is connected via switch 64 to the outputs E and F of optical receiver 30. Subtraction and compensation unit 70 provides compensation to the signal path to balance out or negate any differences between signals S2 and S3 caused by asymmetries in channels 37 and 38 of optical receiver 30.

During the normal mode of operation, optical signal path 10 may typically carry an information signal that is to be analyzed by the spectrum analyzer. However, during the calibration mode, the signal path 10 may be used to input a calibration signal, or balancing tone (b-tone), to input A of the receiver 30. A balancing tone generator 55 generates a predetermined calibration signal or balancing tone (b-tone). The b-tone may be for example, but not limited to, an optical signal having a sub-carrier modulation at a frequency of 0 Hz to 100 MHz.

The b-tone signal may be input to the optical receiver 30 via the signal path 10 or via injecting it into the local oscillator signal LO. The selection of which input of optical receiver 30 the b-tone will be applied may be controlled via switch 11. Switch 11 may be controlled by controller 65.

In the embodiment shown in FIG. 6, an electrical signal S2 from output E of optical receiver 30 and an electrical signal S3 from output F are provided to measurement unit 60. Measurement unit 60 measures the signals S2 and S3 and determines the transfer function characteristics and transfer function ratio of the channels 37 and 38 via which signals S2 and S3 are output. Once the measurement unit 60 has measured each signal S2 and S3, a signal M1 representative of the differences between signal S2 and S3 may be provided to the controller 65. In turn controller 65 generates a control signal C1 that may be provided to subtraction and compensation unit 70. Subtraction and compensation unit 70 in turn makes compensating adjustments during subtraction of the signals S2 and S3 to compensate for, or negate any differences between the signal S2 and S3. The subtraction and compensation unit 70 outputs a signal X representative of the input signals less intensity noise. Controller 65 may be configured to carry out operations in accordance with instructions (software) stored on the memory 80.

Figure 7:
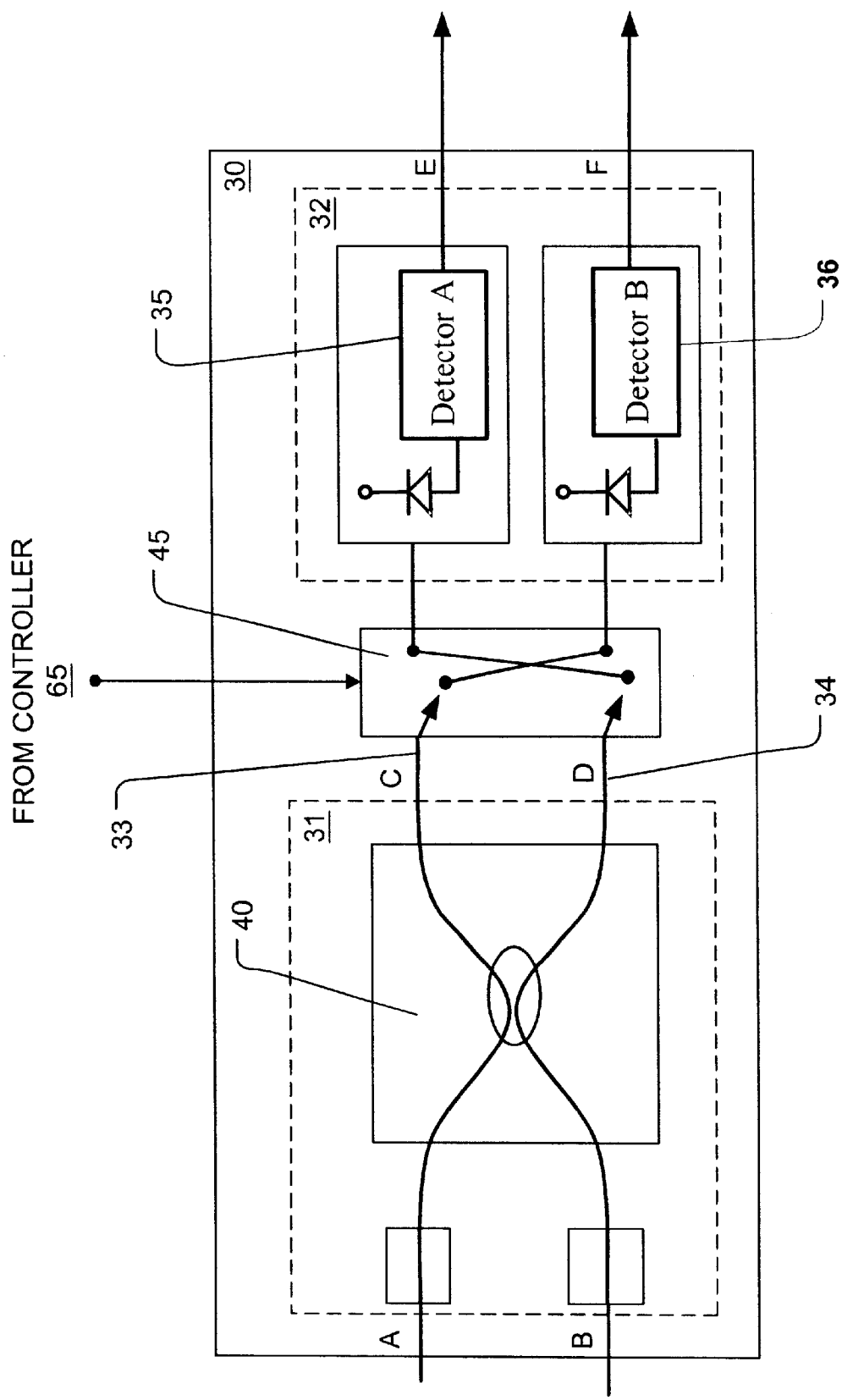
FIG. 7 is an illustration of a further embodiment of optical receiver 30.

FIG. 7 illustrates another embodiment of the optical receiver 30. In this illustration, there is provided a cross-switch 45 for switching the optical outputs C and D between the inputs to detectors 35 and 36 in accordance with a signal from controller 65. With reference to FIG. 3A and FIG. 7 the cross switch 45 may be first set to provide the optical outputs C and D to detectors 35 and 36, respectively. With this setting of the cross switch 45, measurement unit 60 can then measure the signals S2 and S3 as presented to outputs E and F and determine the transfer function characteristics and transfer function ratio of the signal paths (channels 37 and 38) via which signals S2 and S3 are output. Subsequently, the cross switch 45 may then be switched to a second setting to provide, for example, the optical outputs C and D to detectors 36 and 35, respectively. The measurement unit 60 can then again measure the signals S2 and S3 as presented to outputs E and F and determine the transfer function characteristics and transfer function ratio of the signal paths via which signals S2 and S3 are output. Signals representing these two measurements may then be provided to the controller 65, which in turn may generate a control signal C1 that may be provided to subtraction and compensation unit 70.

To minimize the effects of polarization state on the noise subtraction process, optical coupler 40 is preferably a polarization independent coupler. Further, matched components that minimize polarization dependent losses in each of channels 37 and 38 could be used. For example, use of components having a polarization dependent loss (PDL) of less than 3% could be used to minimize the effects of polarization dependent losses.

Figure 8A:
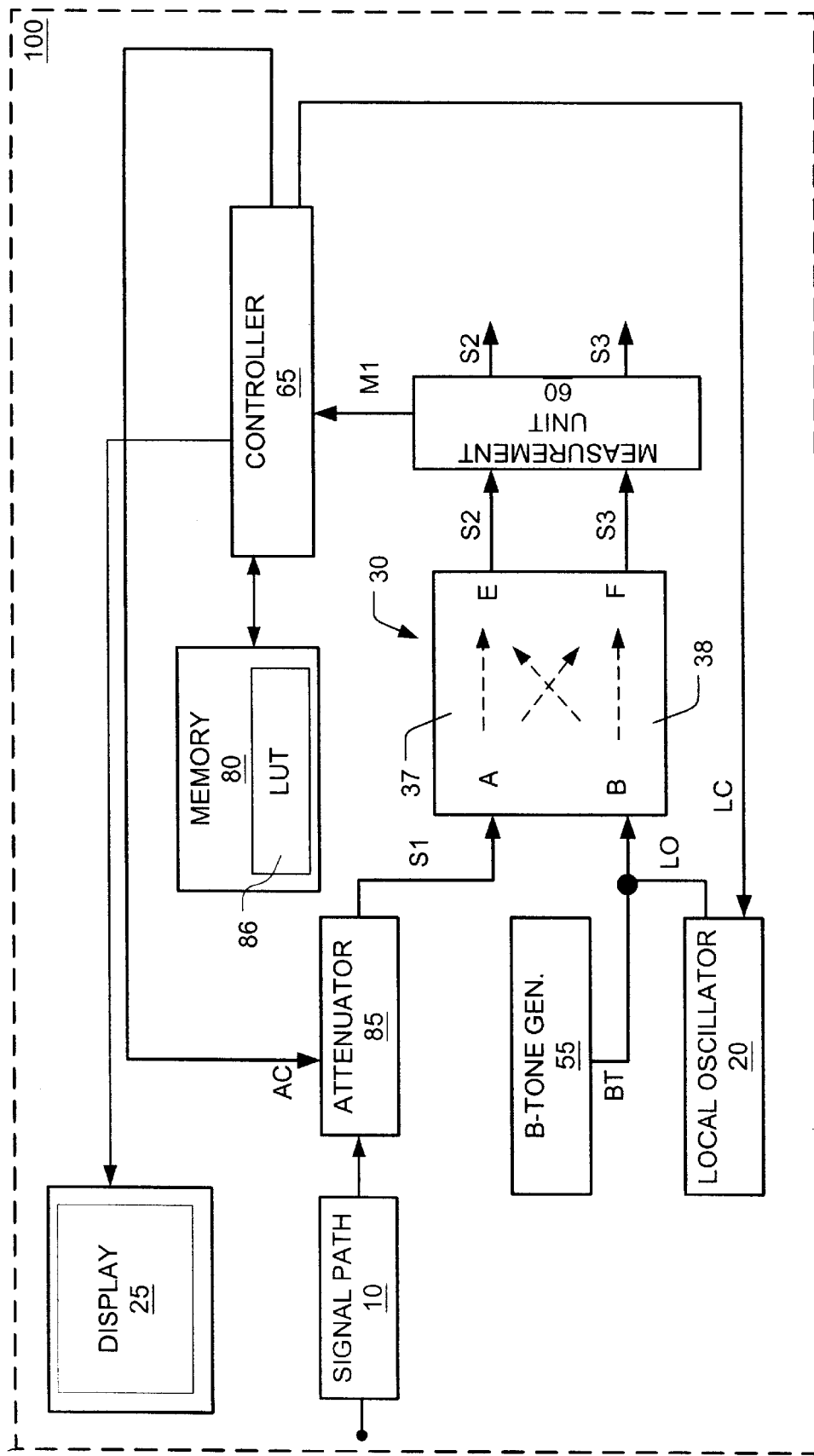
FIG. 8A illustrates an embodiment providing for an optical attenuator at the input of the optical receiver.

FIG. 8A, FIG. 8B, FIG. 8C, FIG. 8D and FIG. 8E illustrate further embodiments of the coherent optical spectrum analyzer 100. In FIG. 8A an optical attenuator 85 has been added in the optical signal path 10 prior to the input A of optical receiver 30. The attenuator 85 may be used to reduce optical power, as well as associated noise, of the signal prior to input to the optical receiver 30. Attenuator 85 may be, for example, a variable attenuator that attenuates between, for example, 0 dB–30 dB. The attenuator 85 may be configured to be variably adjustable in accordance with an attenuation compensation signal AC from controller 65. Controller 65 may also be configured to provide a local oscillator control signal LC to the local oscillator 20 based upon the measurement signal M1, or some other predefined criterion. This local oscillator control signal LC may be used to control the frequency of the local oscillator 20. Controller 65 may be configured to generate the attenuation compensation signal AC based upon measurement signal M1. Controller 65 may also be configured to generate an attenuation compensation signal AC based upon some other predefined criterion or input signal, independent of measurement signal M1.

Alternatively, controller 65 may be configured to generate an attenuation compensation signal AC based upon a correlation of the measurement signal M1 to predetermined criteria stored in, for example, a look up table (LUT) 86. The LUT 86 may be referred to as a corrective look up table. A LUT 86 may be stored in memory 80 for reference by the controller 65.

Figure 8B:
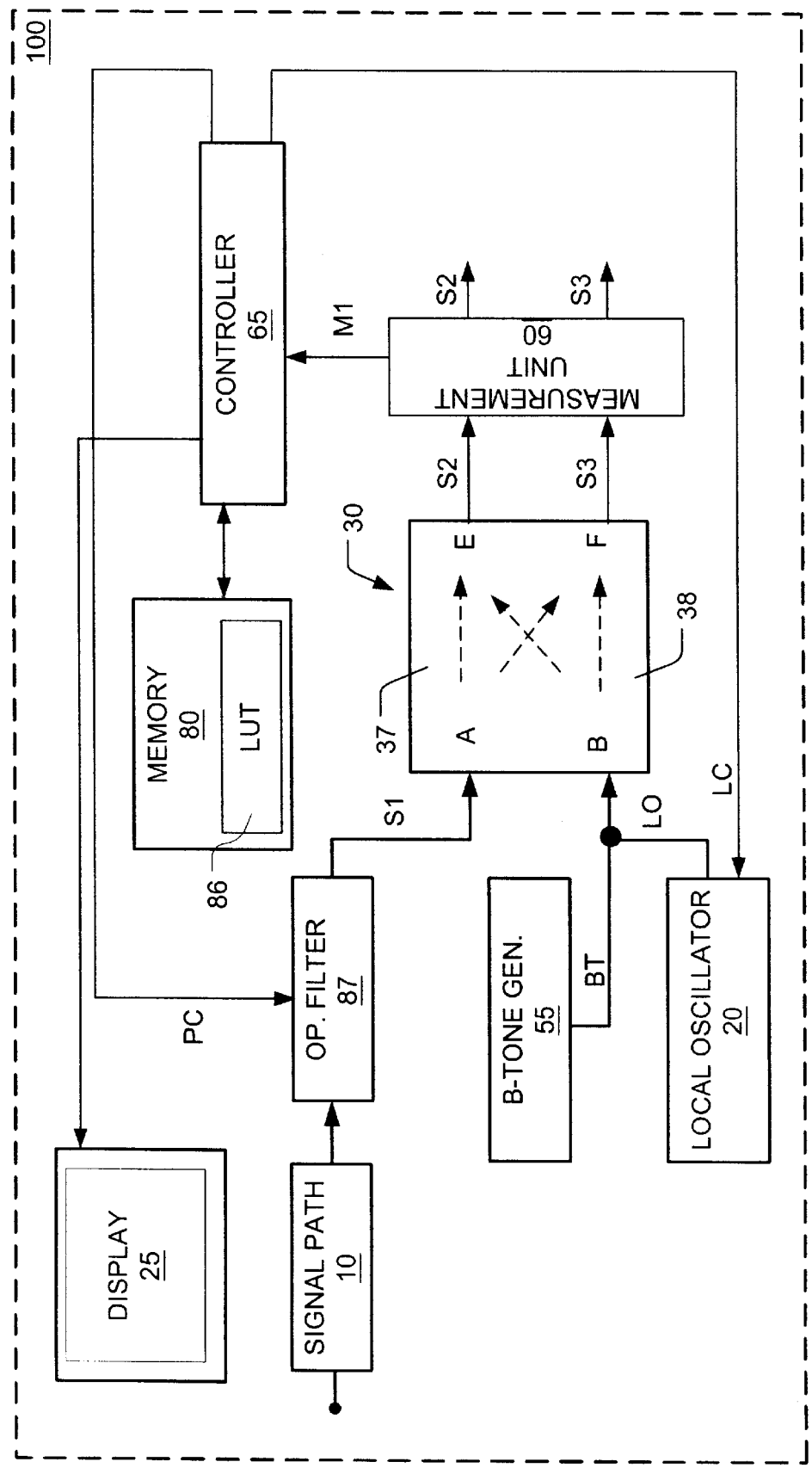
FIG. 8B illustrates an embodiment providing for an optical filter at the input of the optical receiver.

Similarly, in FIG. 8B, an optical filter unit 87, may be provided in the signal path 10. The optical filter unit 87 acts as an optical filter having a predefined bandwidth of operation, for example. The optical filter unit 87 may be adjustable in accordance with the optical filter compensation signal PC from controller 65. The compensation signal would preferably allow for center operating wavelength settings but may also include the optical filter spectral bandwidth and/or transmission efficiency. Controller 65 may also be configured to provide a local oscillator control signal LC to the local oscillator 20 based upon the measurement signal M1, or some other predefined criterion. This local oscillator control signal LC may be used to variably control the frequency of the local oscillator 20. Controller 65 may be configured to generate the attenuation compensation signal PC based upon measurement signal M1. Controller 65 also may be configured to generate a optical filter compensation signal PC based upon some other predefined criteria or input signal, independent of measurement signal M1.

Alternatively, controller 65 may be configured to generate the optical filter compensation signal PC based upon a correlation of the measurement signal M1 to predetermined criteria stored in, for example, a look up table (LUT) 86. A LUT 86 may be stored in memory 80 for reference by the controller 65.

Figure 8C:
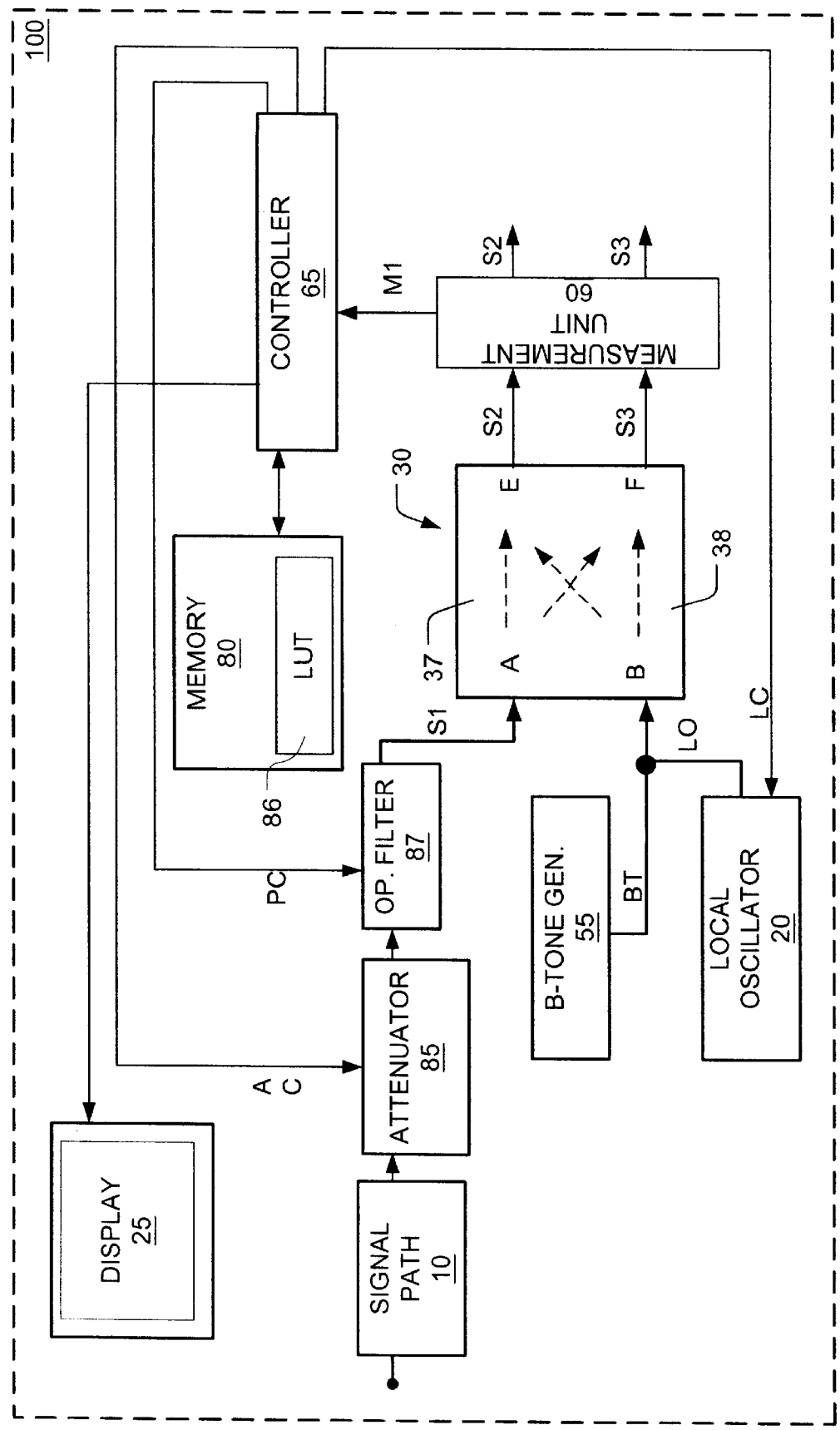
FIG. 8C illustrates an embodiment providing for an optical attenuator and an optical filter at the input of the optical receiver.

FIG. 8C illustrates an embodiment in which both an attenuator 85 and a optical filter unit 87 are provided in the optical signal path 10. The optical filter unit 87 may be adjustable in accordance with the optical filter compensation signal PC from controller 65, while the attenuator 85 may be configured to be adjustable in accordance with an attenuation compensation signal AC from controller 65. Controller 65 may also be configured to provide a local oscillator control signal LC to the local oscillator 20 based upon the measurement signal M1, or some other predefined criteria. This local oscillator control signal LC may be used to variably control the optical frequency or optical power of the local oscillator 20. Controller 65 may be configured to generate the attenuation compensation signal AC and optical filter compensation signal PC based upon measurement signal M1.

Figure 8D:
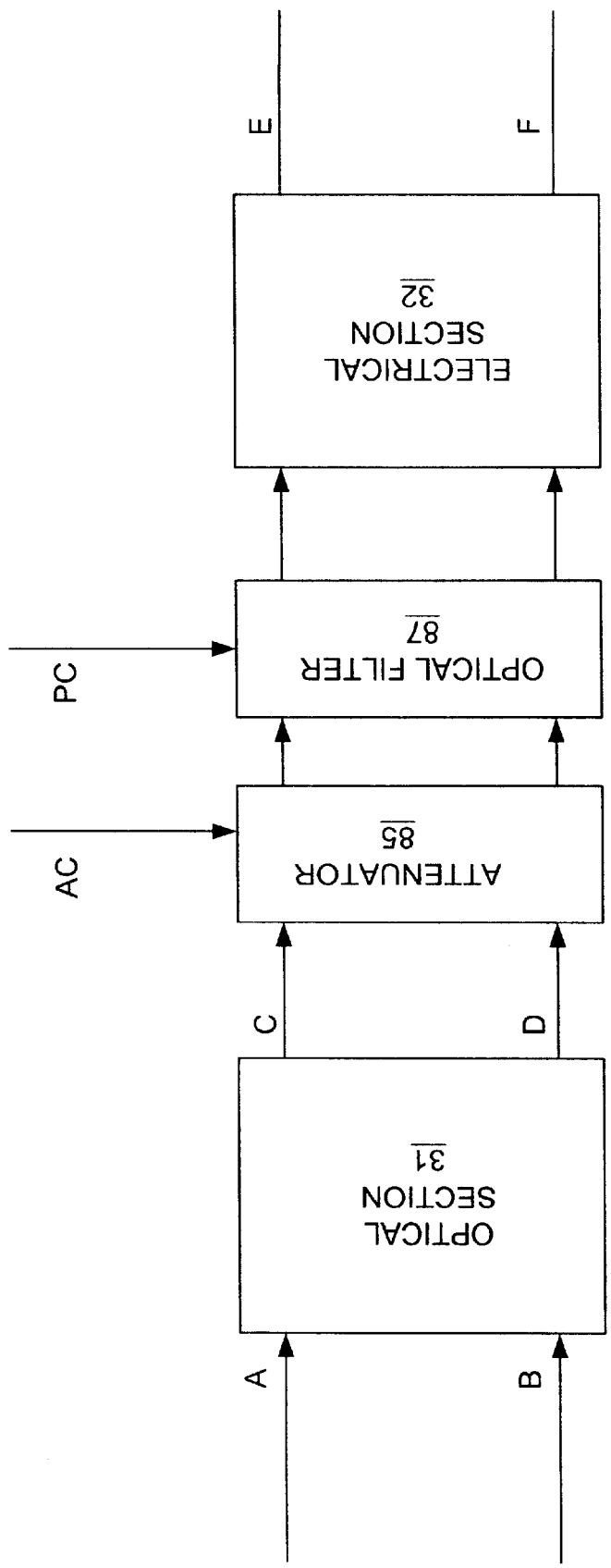
FIG. 8D illustrates an embodiment providing for alternate configuration of an optical attenuator and optical filter unit.

In an alternative embodiment illustrated in FIG. 8D, attenuator 85 and optical filter unit 87, may be configured between the optical section 31 and the electrical section 32. More particularly, in this embodiment attenuator, 85 and/or optical filter 87 may be placed in line between optical section 31 and electrical section 32. It is not necessary that both the attenuator 85 and the optical filter 87 be concurrently provided in the optical receiver 30 to obtain the benefits of the invention. Attenuator 85 may be variably controlled via an attenuation compensation signal AC provided by an external source, such as, for example, controller 65 (FIG. 8A). Optical filter unit 87 may be variably controlled via a optical filter compensation signal PC provided by an external source.

Figure 8E:
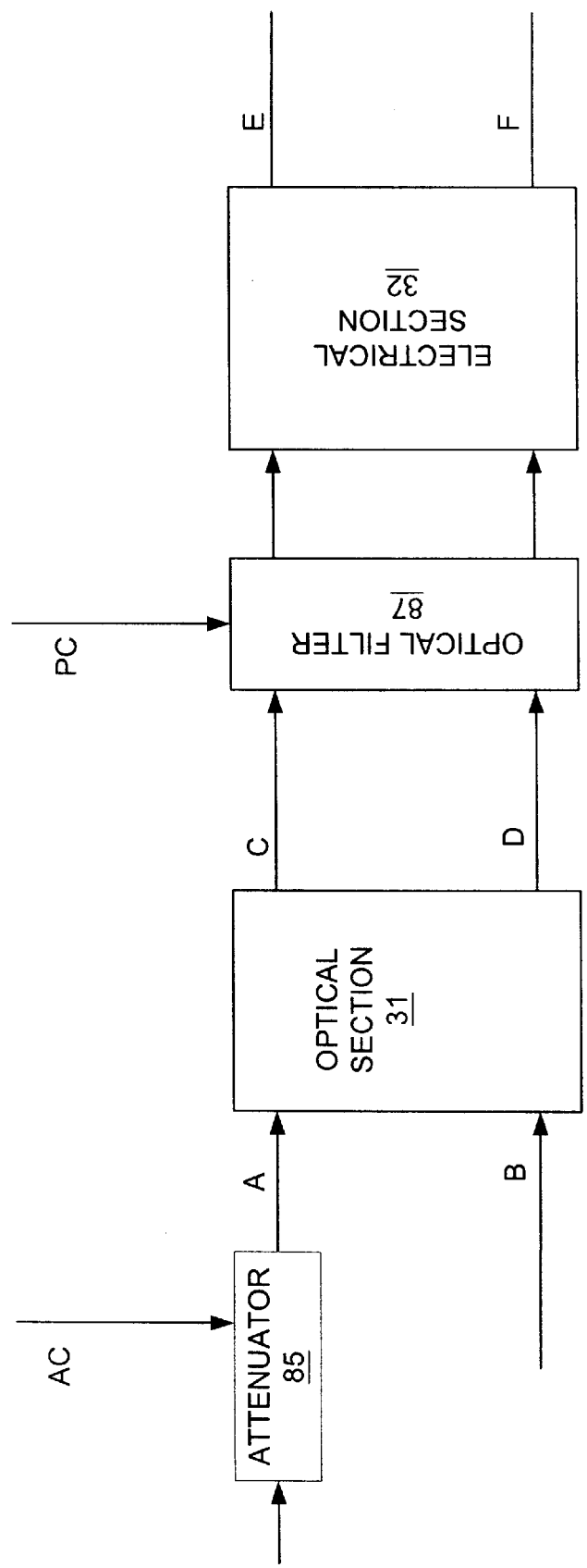
FIG. 8E illustrates a further embodiment providing for a further alternate configuration of an optical attenuator and optical filter unit.

A further embodiment is shown in FIG. 8E. In this embodiment, attenuator 85 is provided at the input A to optical section 31 and may be configured to be controlled by an attenuation control signal AC provided by an external source, such as, for example, controller 65 (FIG. 8A). Optical filter 87 is provided in line between the optical section 31 and the electrical section 32.

In a further embodiment, a b-tone could be injected to both the signal path and the local oscillator signal. The b-tones will preferably be different balancing tones BT1 and BT2 having distinguishing characteristics, such as different frequencies. Balancing tone BT1 may be injected to the signal path 10, while balancing tone BT2 may be injected via the local oscillator signal, for example.

In the embodiments of the invention described above, it will be recognized that optical leads, or interconnects, may be realized with free space optics, fiber optics, planar wave guide optics or any other means of optical transport or processing.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A coherent optical spectrum analyzer comprising:
   a balanced optical receiver for receiving a local oscillator signal and an input signal injected with a b-tone signal, and outputting a first and a second electrical signal in response thereto;
   measuring unit for extracting said b-tone from said first and second electrical signals to determine characteristics of said balanced optical receiver;
   subtraction unit for subtracting said first and said second electrical signals so as to cancel out intensity noise; and
   controller for controlling said subtraction unit in accordance with a measurement signal generated by said measuring unit.

2. A coherent optical spectrum analyzer according to claim 1, wherein said optical receiver comprises a two port 50/50 split optical coupler.

3. A coherent optical spectrum analyzer according to claim 1, wherein said balanced optical receiver comprises:
   an optical section comprising a first and a second optical output;
   an electrical section comprising a first and a second electrical input; and
   a switch for switching the output of said first and said second optical paths to said first and second optical inputs of said electrical section.

4. A coherent optical spectrum analyzer comprising:
   first input for receiving a first optical input signal injected with a b-tone;
   second input for receiving a second optical input signal;
   a coherent optical receiver for receiving said first optical input signal and said second optical input signal and generating first and second electrical output signals in accordance therewith;
   measuring unit for extracting said b-tone from said first and said second electrical output signals and generating a measurement signal in accordance therewith;
   subtraction unit for subtracting said first and said second electrical signals to cancel out intensity noise; and
   controller for controlling said subtraction unit in accordance with said measurement signal.

5. A coherent optical spectrum analyzer according to claim 4, further comprising a local oscillator for generating a local oscillator signal.

6. A coherent optical spectrum analyzer according to claim 4, further comprising an optical mixer for injecting said b-tone into said first optical input signal.

7. A coherent optical spectrum analyzer according to claim 6, further comprising a balancing tone generator for generating said b-tone.

8. A coherent optical spectrum analyzer according to claim 4, wherein said coherent optical receiver further comprises an optical unit and an electrical unit.

9. A coherent optical spectrum analyzer according to claim 8, wherein said electrical unit comprises a first and a second channel, each channel being characterized as having substantially equal electrical transfer function characteristics.

10. A coherent optical spectrum analyzer according to claim 8, wherein said optical receiver comprises a first electro-optical channel and a second electro-optical channel, each channel being characterized as having substantially equal electro-optical transfer function characteristics.

11. A coherent optical spectrum analyzer according to claim 8, wherein said optical receiver comprises a two port 50/50 split optical coupler.

12. A coherent optical spectrum analyzer according to claim 5, further comprising a controller for controlling said local oscillator.

13. A coherent optical spectrum analyzer according to claim 9, further comprising an optical filter for filtering said first optical input signal.

14. A coherent optical spectrum analyzer according to claim 9, further comprising an optical attenuator for attenuating the optical power of said first input signal.

15. A coherent optical spectrum analyzer according to claim 13, wherein said optical filter is controlled by said controller.

16. A coherent optical spectrum analyzer according to claim 14, wherein said optical attenuator is controlled by said controller.

17. A coherent optical spectrum analyzer according to claim 16, wherein said optical attenuator provides 0–30 dB of optical noise attenuation.

18. A method of analyzing an optical signal comprising the steps of:
   receiving a first optical input signal;
   injecting a b-tone into said first optical input signal to produce a b-tone injected signal;
   combining said b-tone injected signal with a second optical input signal to produce first and second optical output signals;
   converting said first and second optical output signals to first and second electrical signals;
   extracting said b-tone from said first and said second electrical signals; and
   measuring said b-tone extracted from said first and said second electrical signals to determine any imbalances and generating a compensation signal.

19. The method of claim 18, further comprising:
   determining compensation necessary to equalize imbalance between said first and second electrical signals based upon said measured b-tone extracted form said first and said second electrical signals; and
   applying compensation to equalize the imbalance between the first and second output signals in accordance with said compensation signal.

20. The method of claim 18, wherein combining comprises the step of combining said b-tone injected signal with a second optical input signal to produce first and second optical output signals having substantially equal amplitude.

21. The method of claim 19, wherein said step of applying compensation is carried out in the time domain.

22. The method of claim 19, wherein said step of determining compensation comprises the step of referring to a look up table (LUT) to determine appropriate compensation.

23. The method of claim 18, wherein said step of measuring comprises determining the transfer function difference between said first and said second electrical signals.

24. The method of claim 23, wherein said step of measuring further comprises expressing said transfer function difference in the time domain.

25. The method of claim 24, wherein said step of measuring further comprises the step of convolving the measured characteristics of said first and second electrical output signal with said transfer function difference.

26. The method of claim 25, wherein said step of measuring further comprises measuring said transfer function difference in the frequency domain.

27. The method of claim 18, wherein said step of injecting a b-tone comprising injecting a b-tone into an optical input signal.

28. The method of claim 18, wherein said step of injecting a b-tone comprises injecting a b-tone into a local oscillator signal.

* * * * *